J. G. BAKER.
Machine for Sawing out Segments of Wood.
No. 211,952. Patented Feb. 4, 1879.
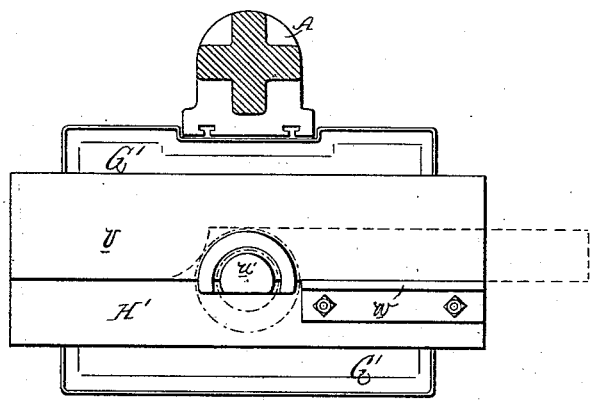
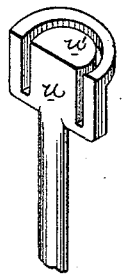
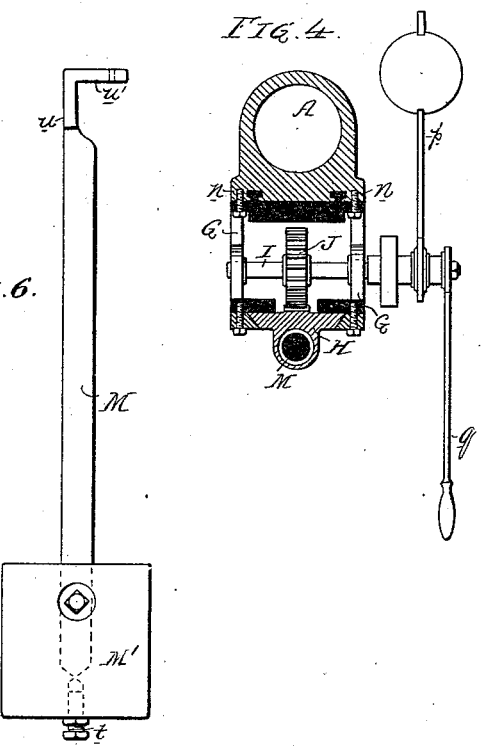
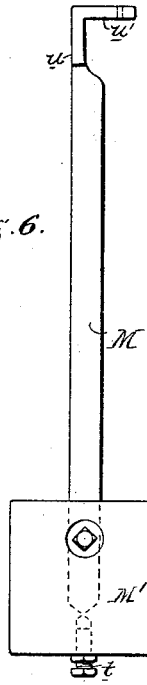
WITNESSES,
Henry Howson Jr.
Harry Smith
INVENTOR.
John G. Baker
by his Attorneys
Howson & Son

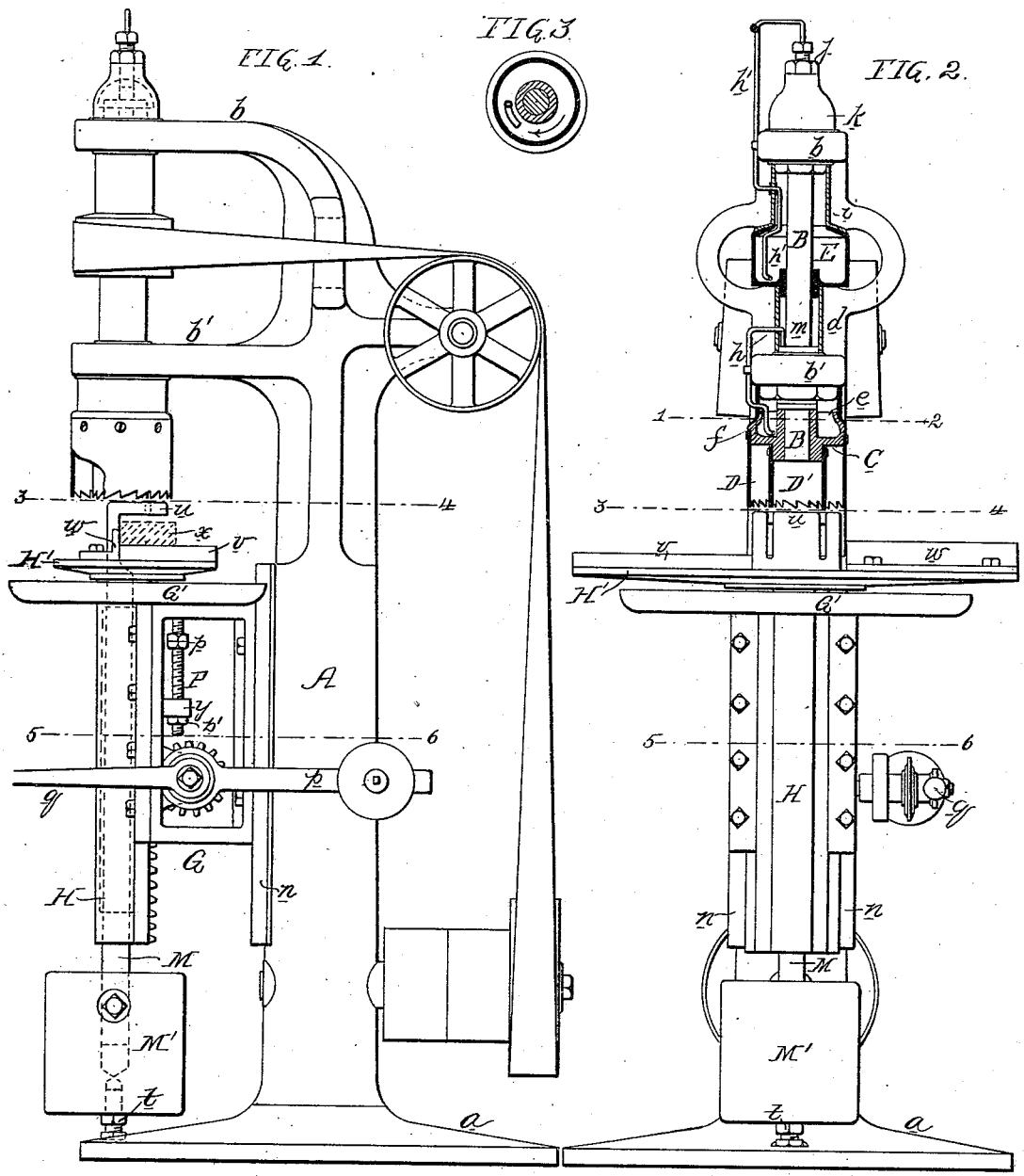

UNITED STATES PATENT OFFICE.

JOHN G. BAKER, OF PHILADELPHIA, PENNSYLVANIA, ASSIGNOR TO THE ENTERPRISE MANUFACTURING COMPANY OF PENNSYLVANIA.

IMPROVEMENT IN MACHINES FOR SAWING OUT SEGMENTS OF WOOD.

Specification forming part of Letters Patent No. 211,952, dated February 4, 1879; application filed December 7, 1878.

*To all whom it may concern:*

Be it known that I, JOHN G. BAKER, of Philadelphia, Pennsylvania, have invented a new and useful Machine for Sawing out Segments of Wood, of which the following is a specification:

My invention relates to that class of sawing-machines in which two concentric barrel-saws are used for cutting out segments; and the objects of my invention are, first, to provide a machine of this class with a device for confining the wood operated on to a table, and for readily releasing the same; and, second, to maintain the bearings of the saw-spindle in a properly-lubricated condition.

Figure 1, Sheet 1, is a side view of my machine for sawing out wooden segments; Fig. 2, a front view, partly in section; Fig. 3, a sectional plan on the line 1 2 of Fig. 2; Fig. 4, Sheet 2, a sectional plan on the line 3 4, Fig. 1; Fig. 5, a sectional plan on the line 5 6, Fig. 2; Fig. 6, a view of a detached portion of the machine; Fig. 7, a perspective view of the upper portion of Fig. 6; Fig. 8, a strip of wood, showing the manner of cutting the segments therefrom.

A is the frame or standard of the machine, having a suitable base, $a$, and two projections, $b\ b'$, in which are the bearings for the vertical saw-spindle B, the latter having at its lower end a plate or carrier, C, to which are secured the two concentric barrel-saws D D', cutting out the segments from a strip of wood in the manner illustrated in Fig. 8.

As the spindle B revolves at great speed, it is important that its bearings should always be maintained in a thoroughly-lubricated condition, an end which is attained in the following manner: A stationary casing, $e$, is secured to the under side of the projection $b'$ of the frame, the lower end of the said casing fitting freely, but snugly, within an internally-projecting flange, $f$, on the saw-carrier C, the latter, with the said flange, forming a reservoir for the oil which escapes from the bearing in the projection $b'$ of the frame, to which projection is secured a small pipe, $h$, the lower end terminating in the said oil-reservoir, and the upper end passing through the casing $d$, and being bent downward in the same, so that its outlet shall be near the spindle where the latter enters the bearing.

The said lower end of the pipe is bent, as shown in Fig. 3, so that its orifice shall be opposed to the oil carried round with the reservoir in the direction of the arrow, the oil consequently passing upward through the pipe and escaping near the top of the bearing.

The hollow pulley E, which receives the driving-belt, forms another reservoir for receiving the oil which escapes from the upper bearing, a casing, $i$, secured to the under side of the projection $b$ of the frame fitting snugly, but freely, at its lower end to an internal flange projecting from the said pulley.

A small pipe, $h'$, bent at its lower end in the same manner as the pipe below, and secured to the said projection $b'$, terminates in a hollow set-screw, $j$, which passes through the top of the casing $k$ on the projection $b$ of the frame, and bears on a washer on the top of the spindle B, so as to keep the collar of the spindle down on its bearing.

As the pulley E revolves the oil will be forced therefrom upward through the pipe $h'$ through the set-screw $j$, and through suitable channels in the same to the upper bearing. The casings $d$ and $i$ serve to prevent the access of dust and dirt to the oil-reservoirs.

A guided bracket, G, is so secured by bolts to a face-plate, $n$, on the frame or standard A as to be vertically adjustable thereon, the bracket having on the top a platform, G'.

To vertical guides in front of the bracket is adapted the leg H of the table H', a pinion, J, on a shaft, I, which has its bearings in projections on the bracket, gearing into a rack at the back of the leg, and the shaft being furnished with a weighted arm, $p$, to counterbalance the table and its leg, and is also furnished with an operating-handle, $q$.

The leg H is hollow for the passage through it and through the table H' of a rod, M, Fig. 6, furnished below with a weight, M', on the under side of which is an adjustable set-screw, $t$, bearing, when the rod is at the limit of its downward movement, on the base of the frame.

At the upper end of the rod M is a segmental head, $u$, (best observed in Fig. 7,) the segment being of such shape and dimensions that it will occupy a position between the two concentric saws without being in contact with either. There is also on the top of the rod M a semicircular projection, $u'$, within the segmental head, and of such dimensions as to be always free from contact with the inner barrel-saw.

When the parts are in the position shown in Fig. 1, the weighted rod M is supported by the base of the machine, and the segmental head $u$ and rounded projection $u'$ of the said rod are so far above the elevated portion $v$ of the table H′ that the strip of wood $x$, Fig. 1, to be sawed into segments can be placed on the said portion $v$ of the table below the head $u$ and projection, and against a guide, $w$. When the wood has thus been properly adjusted beneath the concentric saws, the operator, by means of the lever $q$, turns the shaft I, and, through the medium of the pinion J, elevates the leg H and table H′, and with it the strip of wood $x$. Before the latter can reach the cutting-edges of the saws, however, it comes in contact with the under side of the head $u$ and projection $u'$ of the weighted rod M, and the latter is elevated, so that during the further upward movement of the table the wood is held down to the latter so firmly by the rod and its weight that it can be submitted to the action of the saws, which, as the table is farther elevated, cut out the desired segment, after which the table with its strip of wood is lowered; but before it reaches the limit of its downward movement the weighted rod M is arrested by the base of the machine, and the lowering of the table being continued the wood is released from the pressure of the segmental head $u$, and can be readjusted on the table preparatory to a repetition of the above-described operations.

In order to restrict the movement of the table a screw-rod, P, is secured at its upper end to the bracket G, and is provided with two nuts, $p$ and $p'$, against which a lug, $y$, projecting from the leg H, can strike, the upper nut limiting the upward movement of the table and the lower nut the downward movement of the same.

It will be seen that the stop or guide $w$ is so situated that the outer edge of the wood which bears against it will coincide, or nearly so, with a vertical line passing through the center of the saw-spindle; hence the pieces sawed out are semi-annular. One-half of the concentric saws always overhang the wood, so that there is ample clearance of the sawdust.

I claim as my invention—

1. The combination of the movable table H′, the weighted rod M and its head $u$ $u'$, and the bearing for the lower end of the said rod.

2. The combination of the saw-spindle and each bearing for the same, with a revolving oil-reservoir situated below the bearing, and with a pipe the lower end of which is bent, as described, and contained within the reservoir, the upper end terminating above the bearing, all substantially as described.

In testimony whereof I have signed my name to this specification in the presence of two subscribing witnesses.

JOHN G. BAKER.

Witnesses:
ALEX. PATTERSON,
HARRY SMITH.